US012798876B2

(12) United States Patent
Bang et al.

(10) Patent No.: US 12,798,876 B2
(45) Date of Patent: Nov. 17, 2026

(54) TRANSFER DEVICE

(71) Applicant: Samsung Electronics Co., Ltd., Suwon-si (KR)

(72) Inventors: Jeong Jae Bang, Suwon-si (KR); Sang June Bae, Suwon-si (KR); Dong Hun Seo, Suwon-si (KR); Hyung Sik Um, Suwon-si (KR); Jun Kyu Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 317 days.

(21) Appl. No.: 18/417,562

(22) Filed: Jan. 19, 2024

(65) Prior Publication Data

US 2024/0253899 A1 Aug. 1, 2024

(30) Foreign Application Priority Data

Jan. 31, 2023 (KR) ........................ 10-2023-0012833

(51) Int. Cl.

*B65G 1/04* (2006.01)
*B61B 3/02* (2006.01)
*B61B 12/02* (2006.01)

(52) U.S. Cl.

CPC .............. *B65G 1/0457* (2013.01); *B61B 3/02* (2013.01); *B61B 12/02* (2013.01)

(58) Field of Classification Search

CPC ..... B65G 1/0457; H10P 72/3221; B61B 3/00; B61B 3/02; B61B 12/00; B61B 12/02

(Continued)

(56) References Cited

U.S. PATENT DOCUMENTS 3,525,306 A * 8/1970 Edel et al. .............. B61B 13/04
4,185,562 A * 1/1980 Hatori et al. ............. B61B 7/06 105/152

(Continued)

FOREIGN PATENT DOCUMENTS

KR 10-2013-0015239 A 2/2013
KR 10-2014-0118246 A 10/2014

(Continued)

*Primary Examiner* — S. Joseph Morano
(74) *Attorney, Agent, or Firm* — Muir Patent Law, PLLC

(57) ABSTRACT

An overhead hoist transport (OHT) device is provided. The OHT device comprises a plate including a front bolt groove and a rear bolt groove which are extended and opened in a first direction, and a transport unit including a front body and a rear body, placed on the plate, wherein the transport unit comprises a front neck connector disposed on an upper face of the front bolt groove, a rear neck connector disposed on an upper face of the rear bolt groove, a front traveling wheel placed on both sides of the front body, a rear traveling wheel placed on both sides of the rear body, a front position movement drive unit which is connected to the front neck connector by a first connecting bolt passing through the front bolt groove and a rear position movement drive unit which is connected to the rear neck connector by a second connecting bolt passing through the rear bolt groove, and has the same structure as the front position movement drive unit, wherein the front position movement drive unit and the rear position movement drive unit adjust a placement state of the transport unit on the plate, depending on a load distribution state of the front traveling wheel and the rear traveling wheel.

20 Claims, 11 Drawing Sheets

(58) Field of Classification Search
USPC .................................................. 105/152, 155
See application file for complete search history.

(56) References Cited

U.S. PATENT DOCUMENTS

| | | | | |
|---|---|---|---|---|
| 5,197,390 | A * | 3/1993 | Richardson | B61B 3/02 |
| 6,216,602 | B1 * | 4/2001 | Fukuzaki et al. | B61B 13/04<br>105/152 |
| 8,322,287 | B2 | 12/2012 | Oguro et al. | |

FOREIGN PATENT DOCUMENTS

| | | | |
|---|---|---|---|
| KR | 10-2015-0000527 | A | 1/2015 |
| KR | 10-2019-0063951 | A | 6/2019 |
| KR | 10-2019-0119846 | A | 10/2019 |
| KR | 10-2066431 | B1 | 1/2020 |
| KR | 10-2022-0011747 | A | 1/2022 |

* cited by examiner

TRANSFER DEVICE

CROSS-REFERENCE TO RELATED APPLICATION

This application claims priority from Korean Patent Application No. 10-2023-0012833 filed on Jan. 31, 2023 in the Korean Intellectual Property Office, and all the benefits accruing therefrom under 35 U.S.C. 119, the contents of which in its entirety are herein incorporated by reference.

BACKGROUND

1. Field of the Invention

The present invention relates to a transport unit, and more particularly to overhead hoist transport device.

2. Description of the Related Art

An OHT (Overhead Hoist Transport) device is a container transport device that transports an inter-facility product container, that is, a transport object (FOSB, MAC, CST, etc.) within a semiconductor line. The OHT device includes a carriage that travels along rails installed on a ceiling to transport an object, and a track having rails for guiding the travel of the carriage or the like.

The traveling rail is supported from the ceiling of a clean room or the like, and includes a traveling rail body and a power supply rail. The OHT device includes a traveling drive unit, a steering unit, and traveling wheels, and the traveling wheels may travel along traveling rails. When the OHT device continues to travel on the traveling rail of a curved section, a load distribution in a lateral direction becomes different due to centrifugal force, etc., and a plurality of traveling wheels provided in the OHT device have different wear deviations from each other.

SUMMARY

Aspects of the present invention provide an OHT device in which the load is evenly distributed to the traveling wheels.

According to an embodiment of the present invention, an overhead hoist transport (OHT) device includes a hoist unit including: a plate with a plurality of front bolt grooves and a plurality of rear bolt grooves; and a pair of lower plates extending downwardly from opposite sides of the plate, respectively, wherein the plate extends in a first horizontal direction and a second horizontal direction different from the first horizontal direction, wherein each of the plurality of front and rear bolt grooves extends from an upper surface of the plate and a lower surface of the plate, and wherein each of the plurality of front grooves extends lengthwise in the first horizontal direction and the plurality of front bolt grooves are spaced apart from each other in the second horizontal direction; and a transport unit including: a front body and a rear body that are placed on the upper surface of the plate; a front neck connector disposed on the upper surface of the plate and overlapping the plurality of front bolt grooves; a rear neck connector disposed on the upper surface of the plate and overlapping the plurality of rear bolt grooves, wherein the front neck connector and the rear neck connector are spaced apart from each other in the second horizontal direction; a pair of front traveling wheels that are spaced apart from each other in the first horizontal direction and are placed on opposite sides of the front body; a pair of rear traveling wheels that are spaced apart from each other in the first direction and are placed on opposite sides of the rear body; a front position movement drive unit disposed on the lower surface of the plate and connected to the front neck connector by a plurality of first connecting bolts passing through the plurality of front bolt grooves; and a rear position movement drive unit disposed on the lower surface of the plate and connected to the rear neck connector by a plurality of second connecting bolts passing through the plurality of rear bolt grooves, wherein the front and rear position movement drive units have the same structure. The front position movement drive unit and the rear position movement drive unit are configured to adjust a placement state of the transport unit on the plate, depending on a load distribution state of the pair of front traveling wheels and the pair of rear traveling wheels.

According to an embodiment of the present disclosure, an overhead hoist transport (OHT) device includes a hoist unit including a plate provided with a plurality of front bolt grooves and a plurality of rear bolt grooves, wherein the plurality of front and rear bolt grooves extend from an upper surface of the plate to a lower surface of the plate, and a transport device which is placed on the plate of the hoist unit, and moves along a rail. The transport device comprises: a front body; a front neck connector connected to a lower face of the front body; a pair of front traveling wheels connected to opposite side faces of the front body, respectively; a rear body; a rear neck connector connected to a lower face of the rear body; a pair of rear traveling wheels connected to opposite side faces of the rear body; a front position movement drive unit placed on the lower face of the plate, and connected to the front neck connector by a plurality of first connecting bolts passing through the plurality of front bolt grooves; and a rear position movement drive unit placed on the lower face of the plate, and connected to the rear neck connector by a plurality of second connecting bolts passing through the plurality of rear bolt grooves. The front position movement drive unit and the rear position movement drive unit are configured to move the front body and the rear body in response to load conditions of the pair of front traveling wheels and the pair of rear traveling wheels. The pair of front traveling wheels are spaced apart from each other in a first horizontal direction. The pair of front traveling wheels are spaced apart from the pair of rear traveling wheels in a second horizontal direction perpendicular to the first horizontal direction.

According to an embodiment of the present invention, an overhead hoist transport (OHT) device includes a hoist unit including a plate provided with a plurality of front bolt grooves and a plurality of rear bolt grooves; and a transport device which is placed on the plate of the hoist unit and moves along a rail. The transport device comprises a body; a front neck connector connected to a lower surface of the body; a pair of front traveling wheels connected to opposite side faces of the body; a rear neck connector connected to the lower face of the body; a pair of rear traveling wheels connected to opposite side faces of the body; a plurality of load cell sensors attached to the pair of front traveling wheels and the pair of rear traveling wheels, respectively; a front position movement drive unit which is placed on a lower face of the plate, and connected to the front neck connector through a plurality of first connecting bolts passing through the plurality of front bolt grooves; and a rear position movement drive unit which is placed on the lower face of the plate, and connected to the rear neck connector through a plurality of second connecting bolts passing through the plurality of rear bolt grooves. The plurality of load cell sensors are configured to measure a load distribution among the pair of front traveling wheels and the pair of rear traveling wheels. The front position movement drive unit and the rear position movement drive unit are configured to control a moving direction of the body so that the load distribution is evenly distributed among the pair of front traveling wheels and the pair of rear traveling wheels.

However, aspects of the present invention are not restricted to the one set forth herein. The above and other aspects of the present invention will become more apparent to one of ordinary skill in the art to which the present invention pertains by referencing the detailed description of the present invention given below.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Various embodiments of the present invention will be described below with reference to the accompanying drawings.

Figure 1:
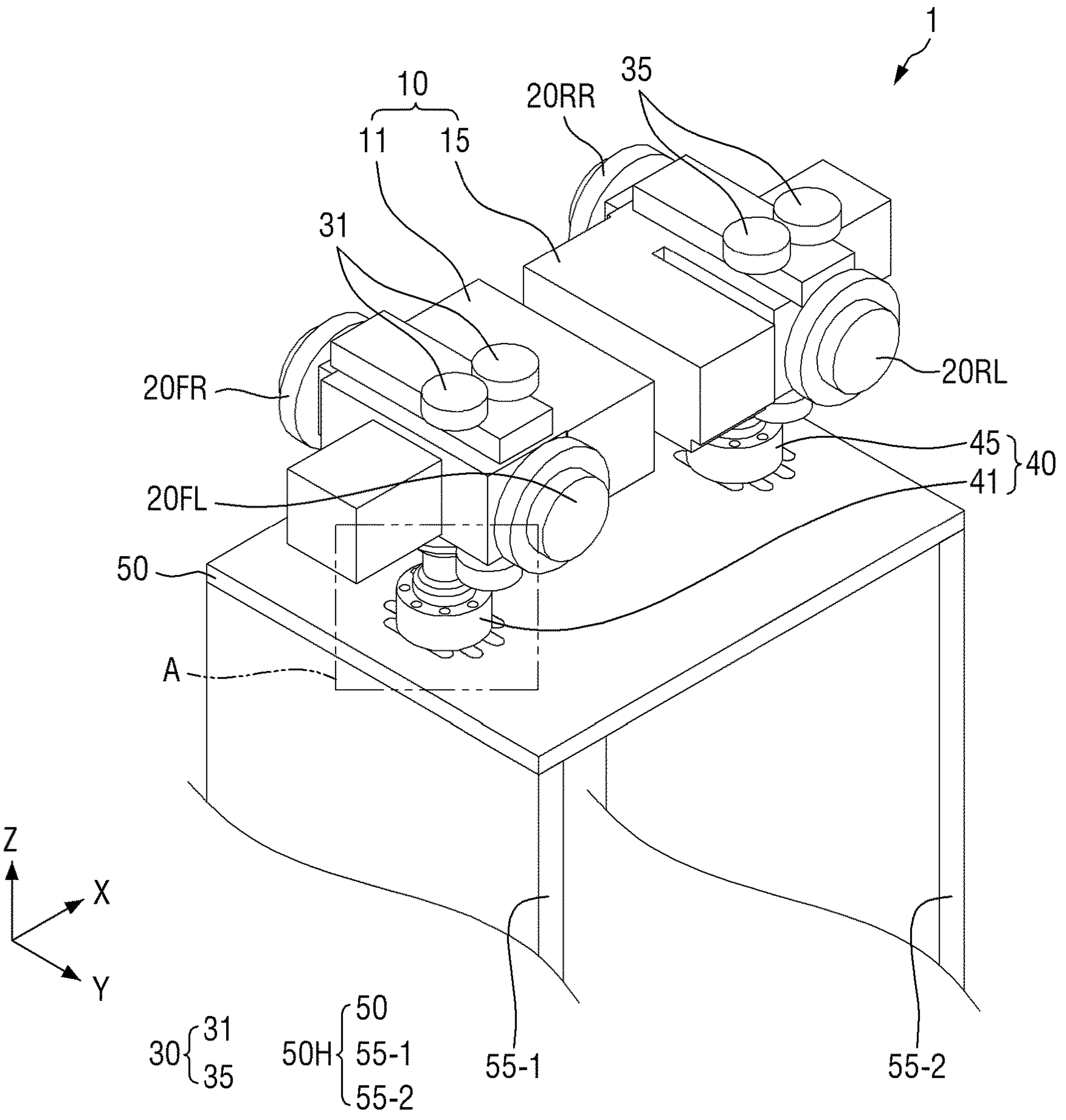
FIG. 1 is a diagram showing an OHT device according to some embodiments.
Figure 2:
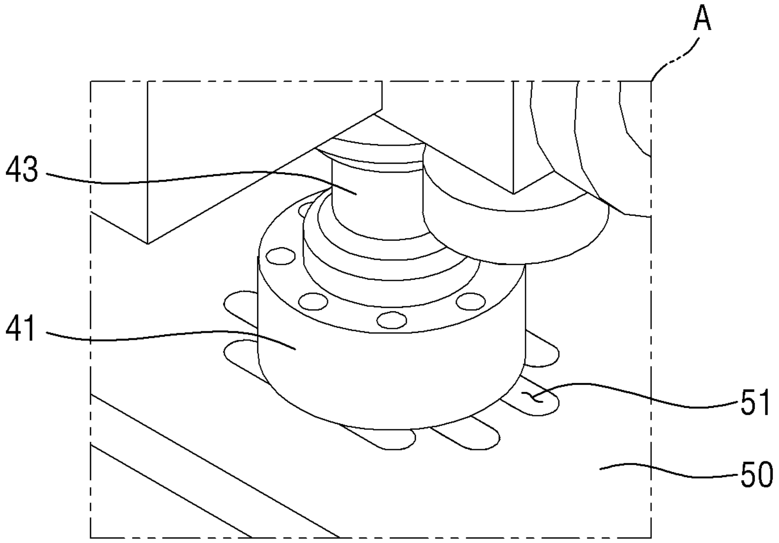
FIG. 2 is an enlarged view of a portion A of the OHT device of FIG. 1.

FIG. 1 is a diagram showing an OHT device according to some embodiments. FIG. 2 is an enlarged view of a portion A of the OHT device of FIG. 1.

Referring to FIGS. 1 and 2, the OHT device 1 includes a transport unit 10 and a hoist unit 50H. The transport unit 10 includes a front body 11 and a rear body 15, traveling wheels 20FL, 20FR, 20RL, and 20RR (hereinafter denoted by 20, when all of them are referred to as) that travel in a direction of rails, steering wheels 31 and 35 (hereinafter denoted by 35, when all of them are referred to as), and a plate position adjuster 40. Although the shown transport unit 10 is shown to include a front body and a rear body, it may be implemented as one body or as two or more bodies depending on various embodiments.

The traveling wheels 20 include a front wheel unit and a rear wheel unit. For example, the front wheel unit includes two front wheels 20FL and 20FR, and the rear wheel unit includes two rear traveling wheels 20RL and 20RR. The present disclosure is not limited thereto. In some embodiments, the traveling wheels 20 may include three or more pairs of traveling wheels. The traveling wheels 20 may further include auxiliary wheels (not shown) and the like in addition to multiple pairs of traveling wheels.

According to some embodiments, as the front wheel unit, a front inner wheel traveling along the inner rail and a front outer wheel traveling along the outer rail may be placed on opposite side faces of the front body 11. A pair of front traveling wheels 20FL and 20FR are connected to opposite side faces of the front body 11.

According to some embodiments, as the rear wheel unit, a rear inner wheel traveling along the inner rail, and a rear outer wheel traveling along the outer rail may be placed on opposite side faces of the rear body 15. A pair of rear traveling wheels 20RL and 20RR are connected to opposite side faces of the rear body 15.

In the traveling wheel unit, the transport device may move forward or backward along the rail, while the traveling wheel rotates with the operation of a front traveling motor or a rear traveling motor.

The steering wheels 31 and 35 are mounted in pairs on the front and rear bodies 11 and 15, and according to some embodiments, the steering wheels 30 may be placed on the front or back of the front and rear bodies 11 and 15, and may be placed on the upper face of the front and rear bodies 11 and 15. The steering wheels include a front steering wheel pair 31 placed on the front body 11, and a rear steering wheel pair 35 placed on the rear body 15.

The traveling wheel 20 travels forward or backward along the rail in the state of being in contact with the rail, and the steering wheels 31 and 35 are rotated by an actuator (not shown) and may change the traveling direction so that the transport unit 10 rotates leftward or rightward.

The plate position adjuster 40 is placed under the front body 11 and the rear body 15. The plate position adjuster 40 includes a front fixing unit and a rear fixing unit. The front and rear fixing units may be placed under the front and rear bodies 11 and 15, respectively.

The front fixing unit includes a front support placed on the lower face of the front body 11 to support the front body 11, and a front neck connector 41 fastened to the other side of the front support. The rear fixing unit includes a rear support placed on the lower face of the rear body 15 to support the rear body 15, and a rear neck connector 45 fixed to the opposite side of the rear support. The front neck connector 41 and the rear neck connector 45 may be connected to a position movement drive unit placed on the front body 11 and a position movement drive unit placed on the rear body 15, respectively.

The hoist unit 50H includes a plate 50, and a pair of lower plates 55-1 and 55-2 attached on opposite side faces of the plate 50. For example, each of the pair of lower plates 55-1 and 55-2 may extend in a vertical direction (e.g., Z-direction) perpendicular to an upper surface of the plate 50. The upper surface of the plate 50 may extend in a first horizontal direction (e.g., X-direction) and a second horizontal direction (e.g., Y-direction). The pair of lower plates 55-1 and 55-2 may be spaced apart from each other in the second horizontal direction. The transport unit 10 is mounted on the upper surface of the plate 50 using the plate position adjuster 40, and a carrier for transporting objects to be transported is mounted on holders attached to inner surfaces of the pair of lower plates 55-1 and 55-2. In some embodiments, the hoist unit 50H may be closed in the second horizontal direction by the pair of lower plates 55-1 and 55-2, and may be open in the first horizontal direction so that the carrier may be placed in an inner space of the hoist unit 50H or taken out from the inner space thereof in the first horizontal direction.

The plate 50 may include a plurality of bolt grooves 51. The bolt grooves 51 may enable the transport unit 10 to move left or right (e.g., move along the first direction (e.g., X-direction or its opposite direction)) or to move backward or move forward (e.g., Y-direction or its opposite direction). In some embodiments, the plurality of bolt grooves 51 may be formed at positions of the plate 50 where the front and rear neck connectors 41 and 45 are located, and may correspond to openings that extend from a lower surface of the plate 50 to an upper surface of the plate 50 in the vertical direction (e.g., Z-direction). According to some embodiments, the plate 50 includes front bolt grooves formed at a corresponding position of the plate 50 where the front neck connector 41 is located, and rear bolt grooves formed at a corresponding position of the plate 50 where the rear neck connector 45 is located. According to some embodiments, the front bolt grooves may include a plurality of first openings, and the rear bolt grooves may include a plurality of second openings. The plurality of first openings may be the same as the plurality of second openings in shape and size of each opening, and arrangements of the openings. For example, each of the plurality of first openings may extend left and right (i.e., extend in the X-direction), and the plurality of first openings may extend in parallel in the X-direction and may be spaced apart from one another in the forward and rearward directions (e.g., in the Y-direction).

According to some embodiments, the bolt grooves 51 may include openings that may extend in the X-direction along which the transport unit 10 may move left or right (i.e., may move in the X-direction or its opposite direction). According to some embodiments, the bolt grooves 51 may include openings that extend in the Y-direction along which the transport unit 10 may move backward or move forward (i.e., move in the Y-direction or its opposite direction). According to some embodiments, the bolt grooves 51 may include an opening in a grid structure or an H-shaped structure in which a long axis extending in the X-direction intersects a short axis extending in the Y-direction so that the transport unit 10 may move forward, backward, leftward or rightward along the opening of the grid structure or the H-shaped structure. In some embodiments, the bolt grooves 51 include openings each of which has a preset width in the X-direction larger than the diameter of the connecting bolt that connects the plate position adjuster 40 on the upper face of the plate to the ball screw 75 on the lower face of the plate 50, and may move backward or move forward within the preset width.

The position movement drive unit 70 may drive the neck connectors 41 and 45 to move along the bolt grooves 51, thereby adjusting the position of the transport unit 10 on the plate 50. That is, the position movement drive unit 70 may move the center of gravity so that the load on each traveling wheel of the OHT device 1 is evenly distributed, by adjusting the alignment position of the transport unit 10 on the plate 50.

Figure 3:
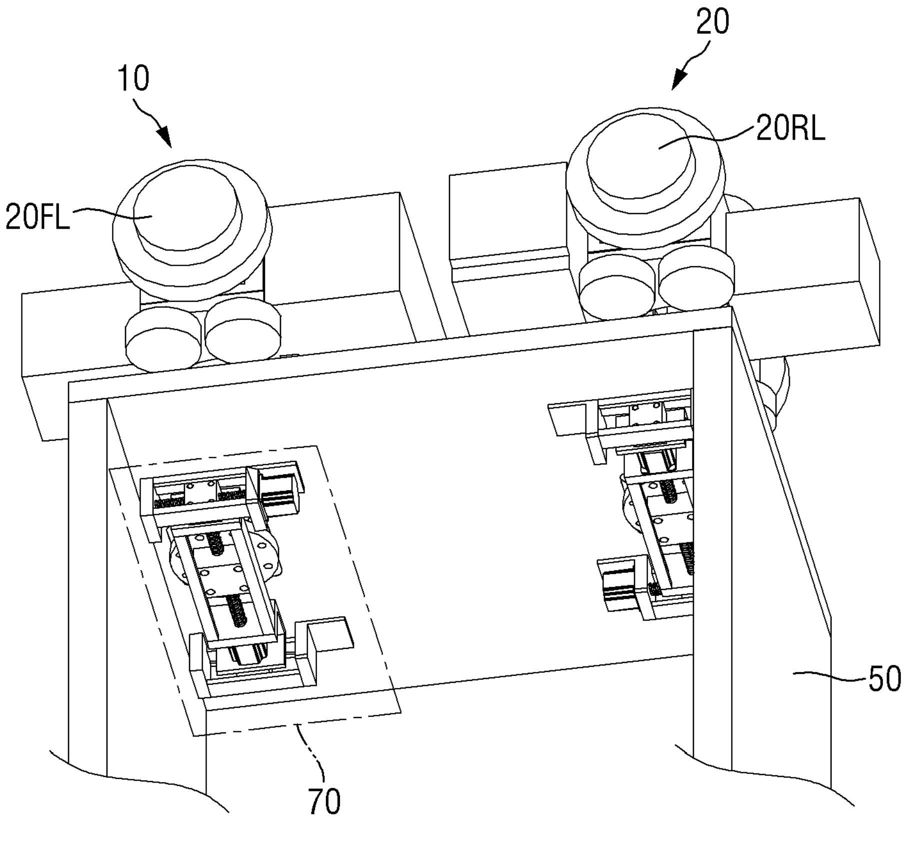
FIGS. 3 and 4 are diagrams for explaining the structure of the lower face of the hoist unit of the OHT device according to some embodiments.
Figure 4:
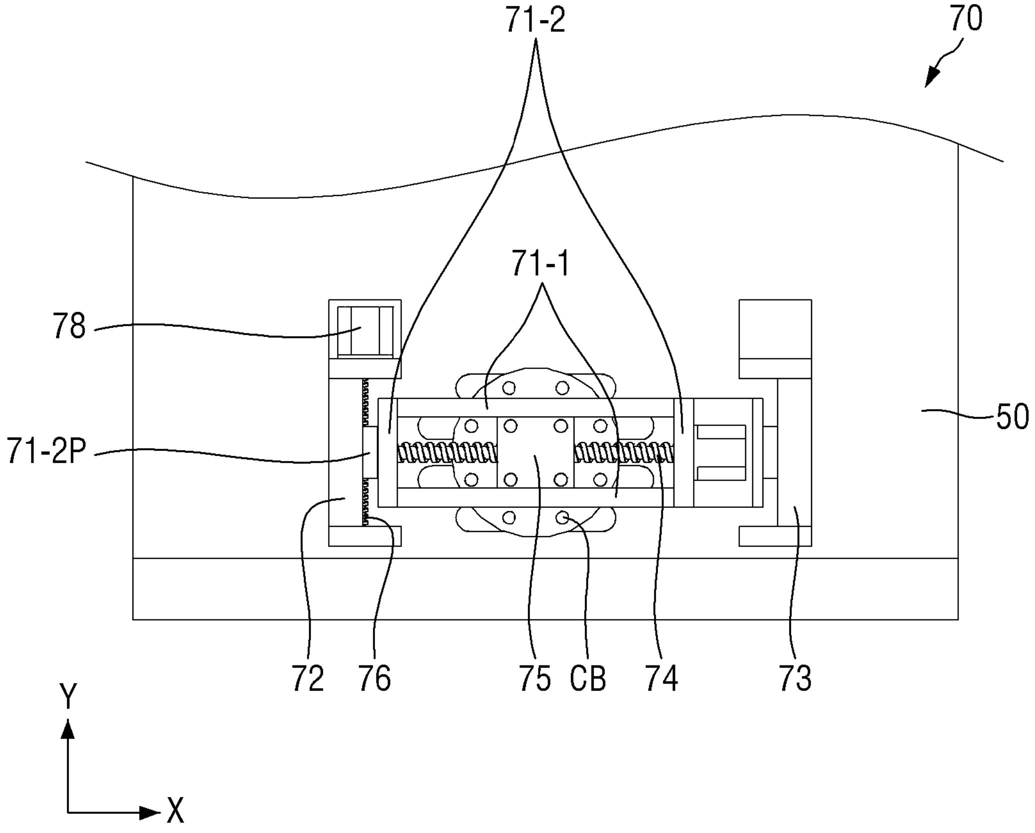

FIGS. 3 and 4 are diagrams for explaining the structure of the lower face of the hoist unit of the OHT device according to some embodiments. Since the front and rear neck connectors 41 and 45 and the position movement drive unit 70 are embodied as the same structure, the following descriptions of FIGS. 3 and 4 are common to both the front and rear.

Referring to FIG. 3, the neck connectors 41 and 45 penetrate the bolt grooves 51 of the plate 50, and are connected to the position movement drive unit 70. The position movement drive unit 70 penetrates the bolt grooves through vertically long connecting bolts, and is connected to the neck connectors 41 and 45. That is, the neck connectors 41 and 45 and the position movement drive unit 70 are fastened to both ends of a first connecting bolt CB to move the transport unit 10 leftward, rightward, backward or forward along the bolt groove.

For example, the position movement drive unit 70 includes a left/right movement frame 71, a front/rear movement frame 72, a first power transfer member 73, a rotary bar 74, an unevenness member 76, and a ball screw 75.

The left/right movement frame 71 may include a pair of first frames 71-1 that extend in the first horizontal direction (e.g., the X-direction) and a pair of second frames 7102 that extend in the second horizontal direction (e.g., the Y-direction). In some embodiments, the pair of first frames 71-1 and the pair of second frames 71-2 may be connected with each other to form a rectangular frame. The pair of first frames 71-1 may extend in the first horizontal direction and may be spaced apart from each other in the second horizontal direction (e.g., Y-direction), and the pair of second frames 71-2 may extend in the second horizontal direction and may be spaced apart from each other in the first horizontal direction. Some of the bolt grooves 51 may overlap a space defined by the rectangular frame. The first power transfer member 73 is attached to one of the pair of second frames 71-2 and rotates the rotary bar 74 (i.e., provide a driving force to the rotary bar 74). For example, the first power transfer member 73 may include a motor, and the first power transfer member 73 and the rotary bar 74 may be collectively referred to as a linear actuator.

The rotary bar 74 is placed to penetrate the pair of second frames 71-2, and is rotated by the driving force provided by the first power transfer member 73. The ball screw 75 is slidably fastened to the middle of the rotary bar 74 and moves leftward or rightward (i.e., moves in the first horizontal direction or its opposite direction) according to the rotation of the rotary bar 74. The ball screw 75 is connected to the plate position adjuster 40 using some of the connecting bolts which connect the position movement drive unit 70 to the neck connectors 41 and 45. For example, four connecting bolts are used to connect the ball screw 75 to the plate position adjuster 40. The present disclosure is not limited thereto. The number of connecting bolts for connecting the ball screw 75 to the plate position adjuster 40 may be less than 4 or more than 5. The driving force of the first power transfer member 73 is converted into a linear motion along the first horizontal direction (e.g., X-direction) or its opposite direction using the rotary bar 74. The ball screw 75 may be slidably attached on the pair of first frames 71-1. The pair of first frames 71-1 may serve as a guide rail along which the ball screw 75 moves during a time when the first power transfer member 73 rotates the rotary bar 74. In some embodiments, the ball screw 75 may be a type of mechanical screw that has recirculating ball bearings running along a helical groove of the rotary bar 74. These bearings allow smooth and low-friction linear motion along the length of the rotary bar 74, which is parallel to the first horizontal direction, when the rotary bar 74 is rotated.

The connecting bolts move along the bolt grooves 51 along the unevenness member 76 in the second horizontal direction (e.g., Y-direction). In some embodiments, one of the pair of second frames 71-2 may be attached to the unevenness member 76 or may be slidably attached thereto.

In some embodiments, the unevenness member 76 may include a linear gear that is slidably engaged with a protruding portion 71-2P of the one of the pair of second frames 71-2. For example, the linear gear and the protruding portion 71-2P may include a series of teeth. The unevenness member 76 may further include a linear motor that moves the linear gear to travel in the second horizontal direction or its opposite direction. Such linear motion of the linear gear may allow the left/right movement frame 71 to move in the second horizontal direction or in its opposite direction. The protruding portion 71-2P may serve as a rack for the linear gear of the unevenness member 76. The alignment state of the transport unit 10 may be adjusted in the first horizontal direction and/or in the second horizontal direction by controlling the movement of the plate position adjuster 40 including the front neck connector 41 and the rear neck connector 45 connected to the ball screw 75 and/or the linear gear.

More specifically, the front/rear movement frame 72 is attached to the lower face of the plate 50, and a second power transfer member 78 is attached to the lower face of the plate 50 and the second movement frame 72. The unevenness member 76 is attached to the inner face of the front/rear movement frame 72. When the second power transfer member 78 provides a driving force to move the front/rear movement frame 72 forward or backward (e.g., in the second direction or in its opposite direction), thereby moving the unevenness member 76 attached to the front/rear movement frame 72 in the second direction or in its opposite direction.

Figure 5:
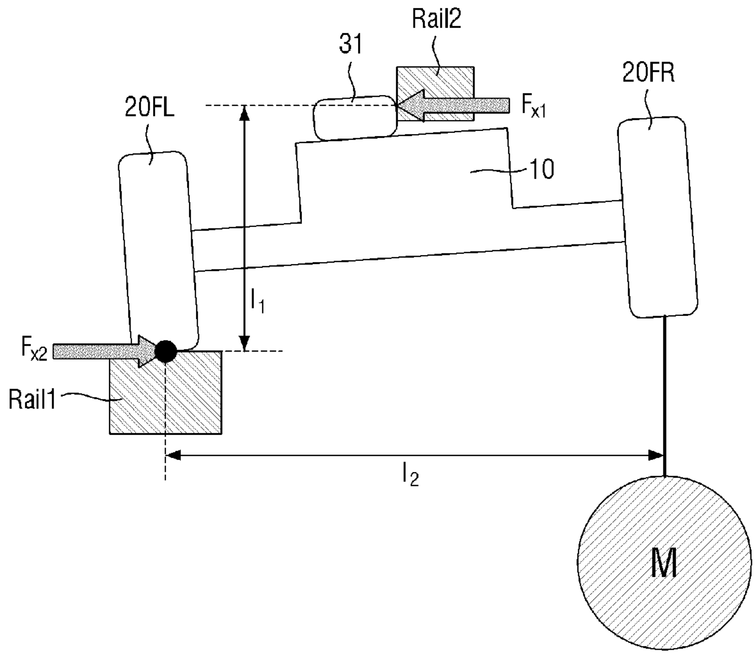
FIGS. 5 and 6 are conceptual diagrams for explaining a traveling wheel wear deviation associated with a change in center of gravity of the OHT device.
Figure 6:
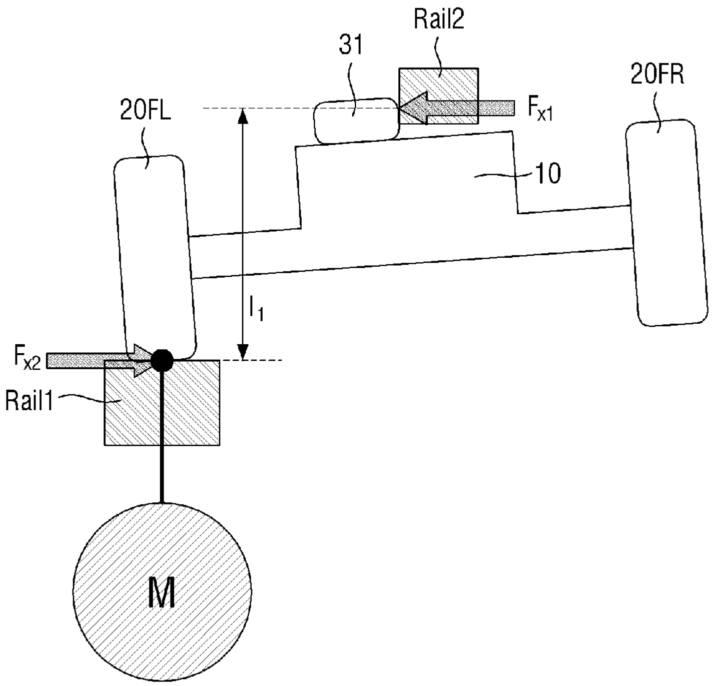

FIGS. 5 and 6 are conceptual diagrams for explaining a traveling wheel wear deviation associated with a change in center of gravity of the OHT device. For convenience of explanation, the front of the transport unit when turning left along the rail 1 is shown. FIG. 5 shows a case where weight distribution (i.e., load distribution) concentrates on the right side when turning leftward, and FIG. 6 shows a case where weight distribution concentrates on the left side when turning leftward.

Load may concentrate on the transport unit 10 in particular directions depending on the process and assembly of the transport unit itself or the driving of the transport unit. For example, in the case of FIG. 5, when the load M concentrates on the right side of the transport unit 10, the frictional force in the left-right direction increases as the load distribution approaches the right side.

Formula 1 shows a frictional force relationship between a centrifugal force and a centripetal force that appear when turning left.

$$\sum F_x = F_{x1} + F_{x2} = 0 \quad \text{(Formula 1)}$$

$\Sigma F_x$ is a total horizontal frictional force when turning left, $F_{x1}$ is a normal force of the steering wheel, and $F_{x2}$ is a frictional force of the traveling wheel.

When the load distribution of the traveling wheels is asymmetrical, the frictional force acting on the traveling wheels on the side with the smaller weight distribution (the left traveling wheel 20FL in the embodiment of FIG. 5, and the right traveling wheel 20FR in the embodiment of FIG. 6) increases.

The frictional force $\Sigma M$ on the traveling wheel may be expressed as Formula 2 in consideration of the normal force of the load M concentrated on the right side of FIG. 5, on the basis of Formula 1.

$$\sum M = F_{x1} l_1 - Mgl_2 = 0 \quad \text{(Formula 2)}$$

The frictional force $F_{x2}$ on the left traveling wheel of FIG. 5 may be expressed as Formula 3, on the basis of Formula 1.

$$F_{x2} = -\frac{Mg}{l_1} l_2 \quad \text{(Formula 3)}$$

M is a weight of the concentrated load, g is a gravitational acceleration coefficient, Mg is a gravity due to load, $l_1$ is a height difference between a point where the frictional force $F_{x1}$ is generated and a point where the frictional force $F_{x2}$ is generated, and $l_2$ is a distance between the center of gravity of the OHT device and the point where the frictional force $F_{x2}$ is generated.

When comparing the frictional force between the traveling wheels 20FL and 20FR of FIG. 5 and FIG. 6, the greater the magnitude 12 is, the greater the frictional force is. Accordingly, the frictional force of the left traveling wheel 20FL of FIG. 5 is great.

Therefore, in the transport unit 10, the load needs to be evenly distributed to all the traveling wheels instead of concentrating the load on the traveling wheels in the particular direction, such that the wear deviation between the traveling wheels decreases.

Figure 7:
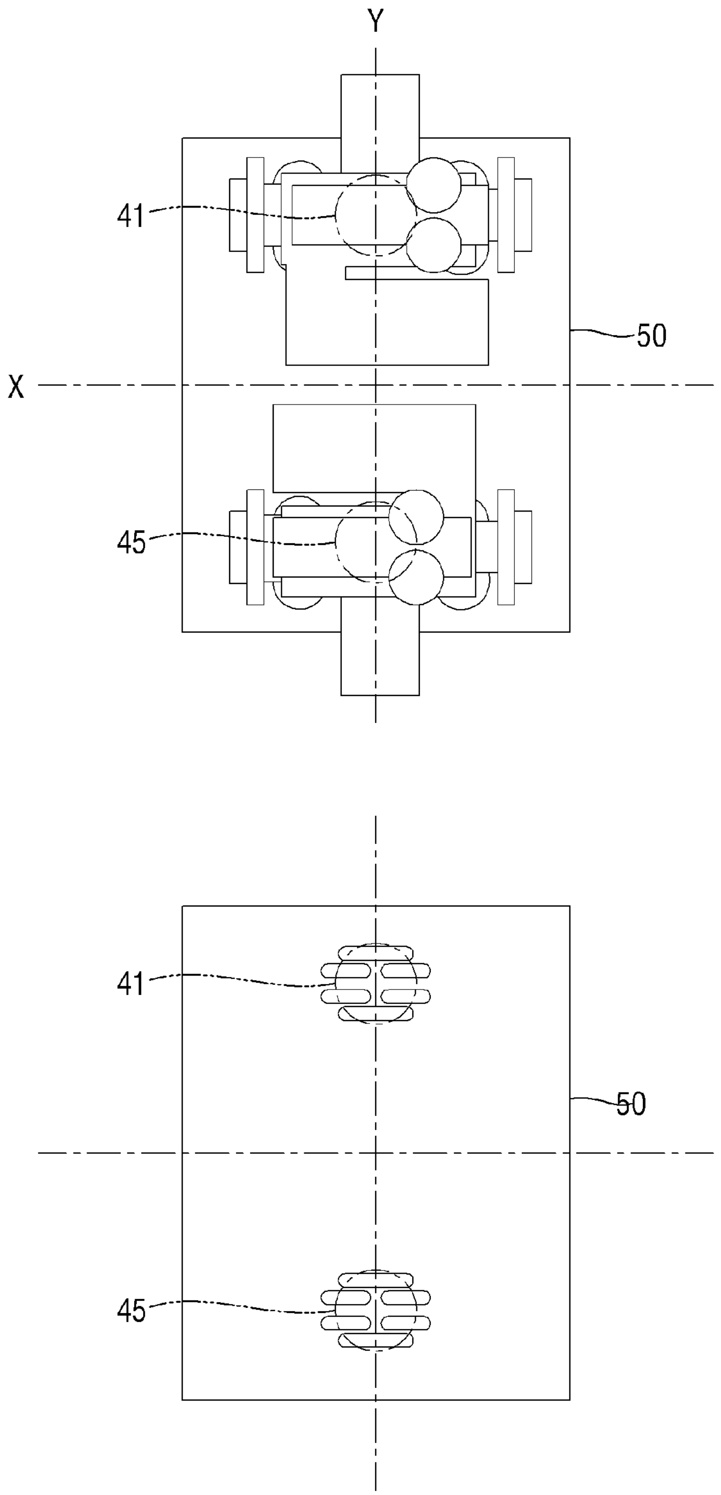
FIG. 7 shows an upper face and a lower face in a case where the OHT device according to some embodiments is placed in a steady state.

FIG. 7 shows an upper face and a lower face in a case where the OHT device according to some embodiments is placed in a steady state.

Referring to FIG. 7, in the steady state, the transport unit 10 is aligned with the center of the plate 50 on the basis of the X-Y axis. More specifically, the neck connectors 41 and 45 of the transport unit 10 are each located at the true center (hereafter referred to as zero) of the bolt groove 51 on the plate 50. For convenience of explanation, the center X-axis and the center Y-axis in the steady state will be explained as a zero-point X-axis and a zero-point Y-axis.

FIGS. 8 to 11 are diagrams showing alignment of the OHT device according to some embodiments. The diagrams show the relative position of the transport unit 10 on the plate 50. For example, FIGS. 8 to 11 are presented for the sake of clarity and illustrate the relative positions of the transport unit 10 with reference to the plate 50. The plate 50 itself remains stationary and is not moved during alignment of the OHT device is performed.

Figure 8:
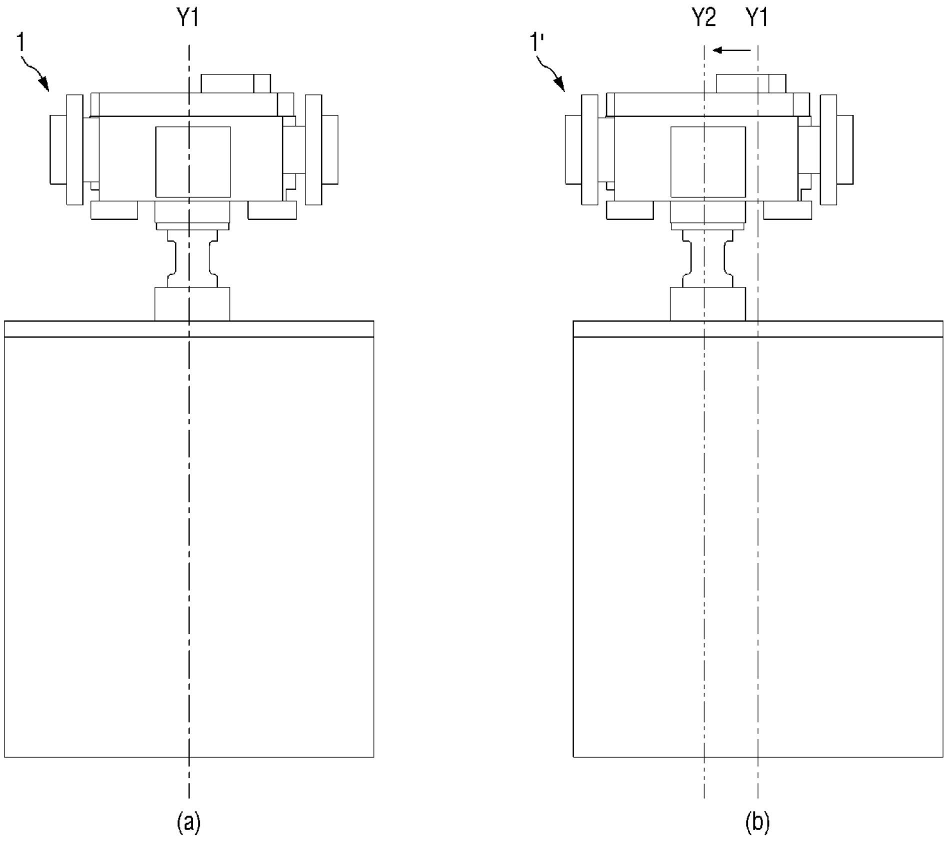
FIG. 8 is a side view of the OHT device according to some embodiments moved laterally.
Figure 9:
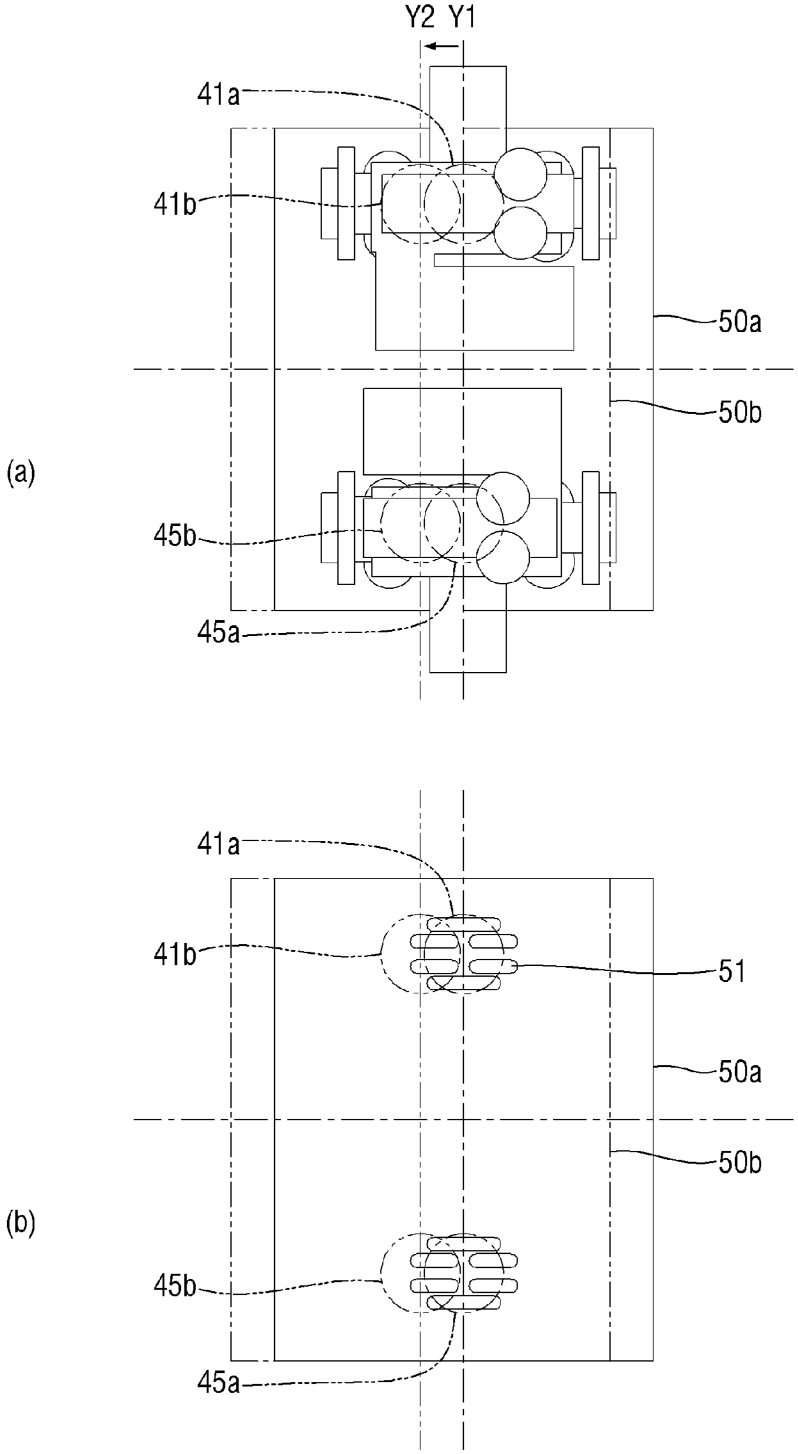
FIG. 9 is a diagram showing the upper and lower faces of the OHT device of FIG. 8.

FIG. 8 is a side view of the OHT device moving laterally according to some embodiments, and FIG. 9 is a diagram showing the upper and lower faces of the OHT device of FIG. 8.

When the load is concentrated on the left or right side of the transport unit 10, the front position movement drive unit and the rear position movement drive unit laterally move the front neck connector 41 and the rear neck connector 45 in a direction opposite to the direction in which the load is concentrated.

Referring to FIGS. 8 and 9, when the load is concentrated on the right side, the transport unit 10 positioned at the zero point (FIG. 8*a*) moves to the left on the basis of the plate center line Y1 and may be aligned along the Y2-axis. When the position of the transport unit 10 is changed, the front neck connector 41 positioned on the zero point Y-axis Y1 moves along the bolt groove 51 that extends along the X-axis, and moves up to the Y2-axis.

That is, from the Y1-axis to the Y2-axis, the neck connectors 41*a* and 41*b* of the front body 11 and the neck connectors 45*a* and 45*b* of the rear body 15 horizontally move leftward by the same distance Y2-Y1 in the X direction.

In some embodiments, when the sensor 100 measures that a load is concentrated on a left wheel 20FL of the pair of front traveling wheels 20FL and 20FR and a left wheel 20RL of the pair of rear traveling wheels 20RL and 20RR or a right wheel 20FR of the pair of front traveling wheels 20FL and 20FR and a right wheel 20RR of the pair of rear traveling wheels 20RL and 20RR, the front position movement drive unit and the rear position movement drive unit are configured to move the front neck connector 41 and the rear neck connector 45 in a rightward direction or in a leftward direction until the load is evenly distributed among the pair of front traveling wheels 20FR and 20FL and the pair of rear traveling wheels 20RR, and 20RL.

Figure 10:
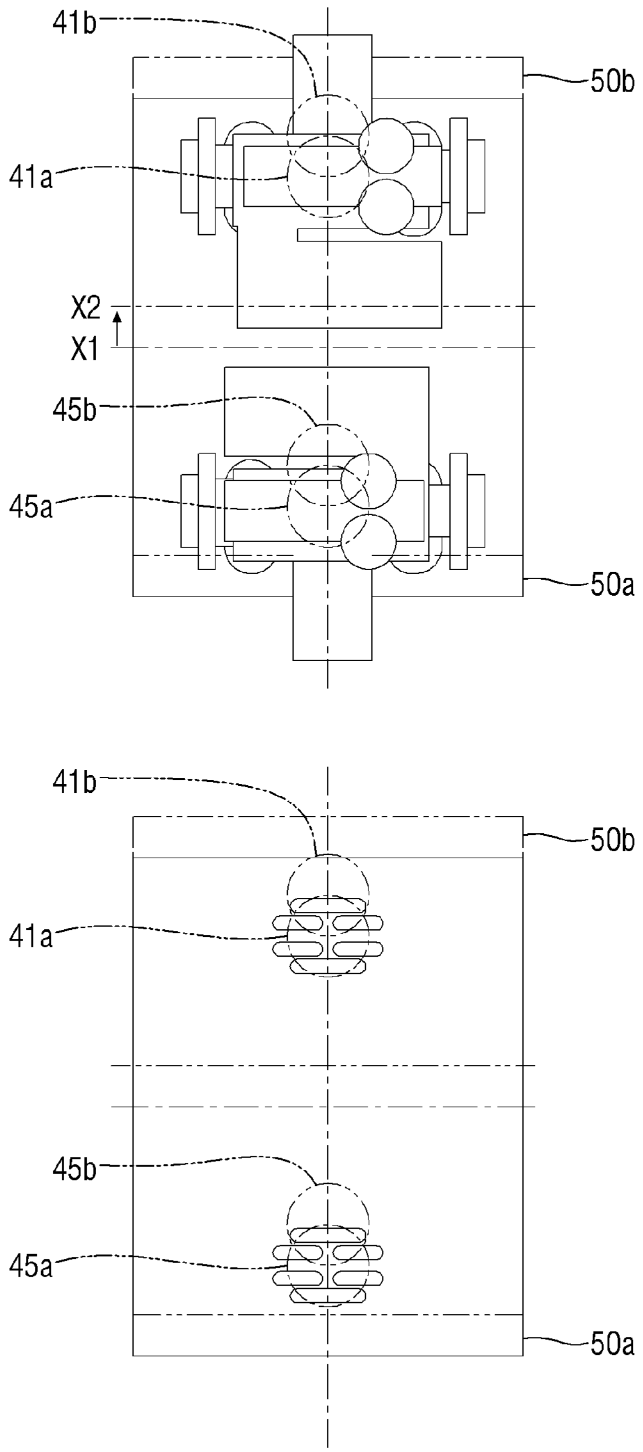
FIG. 10 is a diagram showing an upper face and a lower face when the OHT device is placed to move backward or move forward according to some embodiments.

FIG. 10 is a diagram showing an upper face and a lower face when the OHT device is placed to move backward or move forward according to some embodiments.

When the load is concentrated on the front face or rear face of the transport unit 10, the front position movement drive unit and the rear position movement drive unit move the front neck connector 41 and the rear neck connector 45 backward or forward in the direction away from the front face or rear face on which the load is concentrated. When the sensor 100 measures that a load measured at the pair of front traveling wheels 20FL and 20FR is greater than a load measured at the pair of rear traveling wheels 20RL and 20RL, it is determined that the load is concentrated at the front face of the transport unit 10. When the sensor 100 measures that a load measured at the pair of front traveling wheels 20FL and 20FR is lower than a load measured at the pair of rear traveling wheels 20RL and 20RL, it is determined that the load is concentrated at the rear face of the transport unit 10. Referring to FIG. 10, when the load is concentrated on the rear face, the transport unit 10 located at the zero point (FIG. 8*a*) moves forward on the basis of the plate center line X1 and may be aligned with the X2-axis. The front neck connector 41 positioned on the zero point X-axis X1 when the position of the transport unit 10 is changed moves to the front/rear movement frame 72 along the bolt groove 51, and move up to the X2-axis.

That is, from the X1-axis to the X2-axis, the neck connectors 41*a* to 41*b* of the front body 11 and the neck connectors 45*a* to 45*b* of the rear body 15 are horizontally moved forward by the same distance (X2-X1) in the Y direction. The front body 11 and the rear body 15 are moved from the plate zero point position 50*a* to the plate movement position 50*b*. When a load is determined as concentrated on a front face of the transport unit 10 or a rear face of the transport unit 10, the front position movement drive unit and the rear position movement drive unit are configured to move the front neck connector and the rear neck connector in a backward direction or in a forward direction until the load is evenly distributed among the pair of front traveling wheels and the pair of rear traveling wheels.

Figure 11:
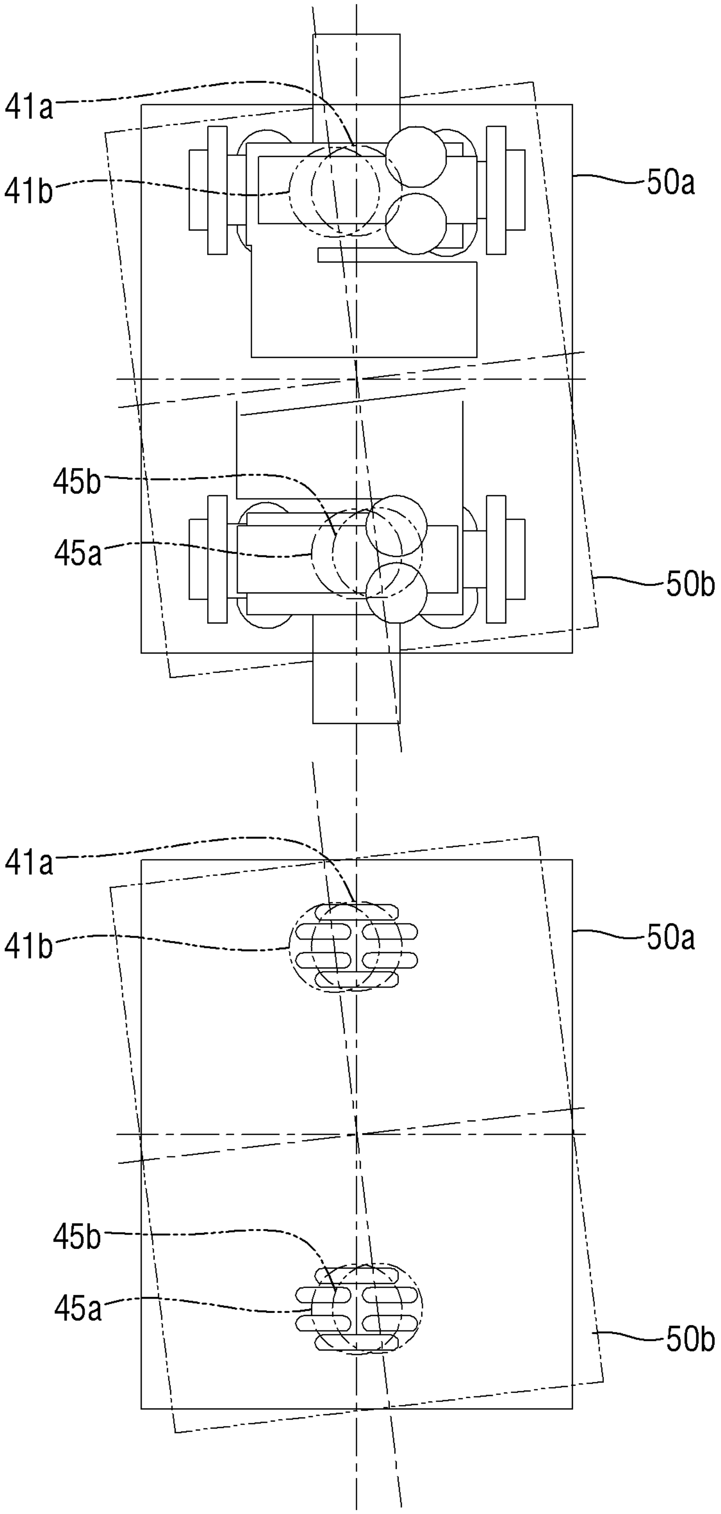
FIG. 11 is a diagram showing an upper face and a lower face when the OHT device tilted at a predetermined angle according to some embodiments.

FIG. 11 is a diagram showing an upper face and a lower face when the OHT device tilted at a predetermined angle according to some embodiments.

The load may be concentrated on either the front traveling wheel or the rear traveling wheel of the transport unit 10. In the shown example, when a load is concentrated on any one of the four traveling wheels, the front position movement drive unit moves the front neck connector in a first direction, and the rear position movement drive unit moves the rear neck connector in a second direction different from the first direction, and may tilt the alignment state of the transport unit 10 on the plate 50.

Referring to FIG. 11, when the load is concentrated in a specific diagonal direction, for example, when the load is concentrated on the rear left traveling wheel 20RL, in the transport unit 10 positioned at the zero point (FIG. 8*a*), the front traveling wheels 20FL and 20FR may move leftward and the rear traveling wheels 20RL and 20RR may move rightward on the basis of the zero point (the intersection of X1-Y1) to obtain an intersection alignment. When the position of the transport unit 10 is changed, the front neck connector 41 located on the zero point X-axis X1 moves leftward along the bolt groove 51 from the left/right movement frame 71, and the rear neck connector 45 may move rightward along the bolt groove 51 from the left/right movement frame 71. Also, according to some embodiments, the transport unit 10 may move forward or backward within the front front/rear movement frame 72 depending on the degree to which it is tilted in an intersection alignment manner. In some embodiment, when a load is determined as concentrated in a diagonal direction of the transport unit 10, the front position movement drive unit and the rear position movement drive unit are configured to rotate the front neck connector and the rear position movement drive unit in a clockwise direction or in a counterclockwise direction with reference to a center point of the transport unit 10 until the load is evenly distributed among the pair of front traveling wheels and the pair of rear traveling wheels. In some embodiment, the center point of the transport unit may correspond to a center of gravity of the transport unit 10.

Figure 12:
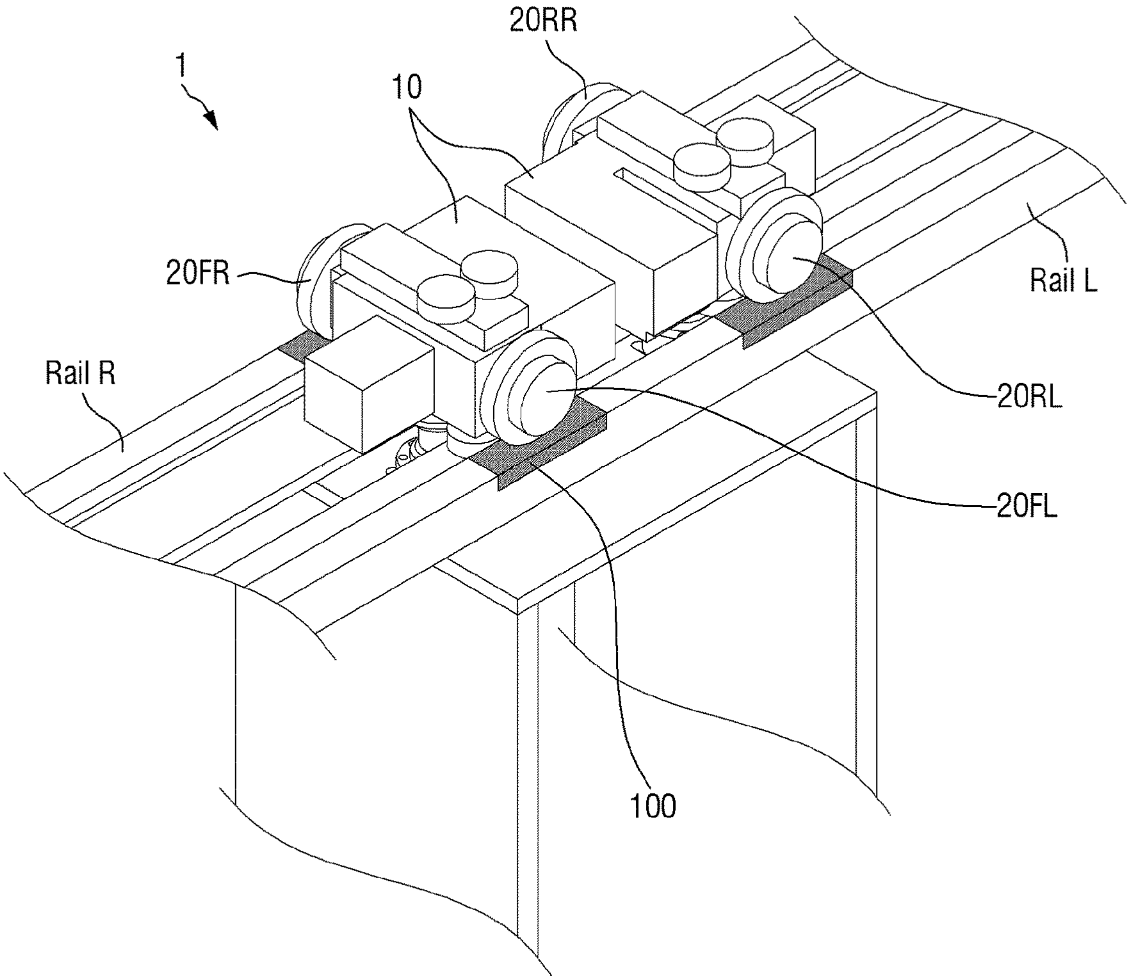
FIG. 12 is a diagram showing the OHT device according to some embodiments.

FIG. 12 is a diagram showing the OHT device according to some embodiments.

Referring to FIG. 12, the transport unit 10 may further include a sensor 100 placed between the traveling wheels 20 and the rail. The sensor may be a weight measurement sensor or a wheel wear measurement sensor according to some embodiments. For example, the weight measurement sensor may include a load cell sensor that measures force and coverts the measured force to an electrical signal that represents a value of mass or torque. For the convenience of description, the weight measurement sensor is referred to as the sensor 100.

For example, the weight measurement sensor 100 may be provided for each of the traveling wheels 20FL, 20FR, 20RR, and 20RL. For example, the weight measurement sensor 100 may be fastened to the rail under the traveling wheel 20. The present disclosure is not limited thereto. In some embodiments, the weight measurement sensor 100 may be disposed in a space between a drive unit of traveling wheels (e.g., 20FL and 20FR) and a drive shaft that connects the traveling wheels (e.g., 20FL and 20FR). In some embodiments, the weight measurement sensor 100 may be a sensor (e.g., a load cell sensor) attached to the traveling wheels 20FL, 20FR, 20RR, and 20RL. For example, each of the traveling wheels 20FL, 20FR, 20RR, and 20RL may be attached to a corresponding weight measurement sensor. The scope of the present invention is not limited to the above embodiments.

The sensor 100 measures the load on each of the traveling wheels 20FL, 20FR, 20RR, and 20RL. The OHT device 1 may determine the direction of load concentration based on the load measurement result of the sensor 100. The OHT device 1 moves the position of the transport unit 10 on the plate 50 as described with reference to FIGS. 8 to 11 and may adjust the load to be evenly distributed among the traveling wheels 20.

Although the embodiments of the present invention have been described above with reference to the accompanying drawings, the present invention is not limited to the above embodiments, and may be fabricated in various forms. Those skilled in the art will appreciate that the present invention may be embodied in other specific forms without changing the technical spirit or essential features of the present invention. Accordingly, the above-described embodiments should be understood in all respects as illustrative and not restrictive.

What is claimed is:

1. An overhead hoist transport (OHT) device comprising:
a hoist unit including:
a plate with a plurality of front bolt grooves and a plurality of rear bolt grooves; and
a pair of lower plates extending downwardly from opposite sides of the plate, respectively, wherein the plate extends in a first horizontal direction and a second horizontal direction different from the first horizontal direction, wherein each of the plurality of front and rear bolt grooves extends from an upper surface of the plate and a lower surface of the plate, and wherein each of the plurality of front bolt grooves extends lengthwise in the first horizontal direction and the plurality of front bolt grooves are spaced apart from each other in the second horizontal direction; and
a transport unit including:
a front body and a rear body that are placed on the upper surface of the plate;
a front neck connector disposed on the upper surface of the plate and overlapping the plurality of front bolt grooves;
a rear neck connector disposed on the upper surface of the plate and overlapping the plurality of rear bolt grooves, wherein the front neck connector and the rear neck connector are spaced apart from each other in the second horizontal direction;
a pair of front traveling wheels that are spaced apart from each other in the first horizontal direction and are placed on opposite sides of the front body;
a pair of rear traveling wheels that are spaced apart from each other in the first horizontal direction and are placed on opposite sides of the rear body;
a front position movement drive unit disposed on the lower surface of the plate and connected to the front neck connector by a plurality of first connecting bolts passing through the plurality of front bolt grooves; and
a rear position movement drive unit disposed on the lower surface of the plate and connected to the rear neck connector by a plurality of second connecting bolts passing through the plurality of rear bolt grooves, wherein the front and rear position movement drive units have the same structure, wherein the front position movement drive unit and the rear position movement drive unit are configured to adjust a placement state of the transport unit on the plate, depending on a load distribution state of the pair of front traveling wheels and the pair of rear traveling wheels.

2. The OHT device of claim 1,
wherein when a load is measured as concentrated on a left wheel of the pair of front traveling wheels and a left wheel of the pair of rear traveling wheels or a right wheel of the pair of front traveling wheels and a right wheel of the pair of rear traveling wheels, the front position movement drive unit and the rear position movement drive unit are configured to move the front neck connector and the rear neck connector in a rightward direction or in a leftward direction until the load is evenly distributed among the pair of front driving wheels and the pair of rear driving wheels.

3. The OHT device of claim 1,
wherein when a load is measured as concentrated on a front face of the transport unit or a rear face of the transport unit, the front position movement drive unit and the rear position movement drive unit are configured to move the front neck connector and the rear neck connector in a backward direction or a forward direction until the load is evenly distributed among the pair of front traveling wheels and the pair of rear traveling wheels.

4. The OHT device of claim 1, wherein when a load is measured as concentrated in a diagonal direction of the transport unit, the front position movement drive unit is configured to move the front neck connector in the first horizontal direction, and the rear position movement drive unit is configured to move the rear neck connector in the second horizontal direction until the load is evenly distributed among the pair of front traveling wheels and the pair of rear traveling wheels.

5. The OHT device of claim 1,
wherein the transport unit further comprises a plurality of load cell sensors attached to the pair of front traveling wheels and the pair of rear traveling wheels.

6. The OHT device of claim 1,
wherein the front position movement drive unit comprises:
a left/right movement frame including a pair of first frames extending in the first horizontal direction and being spaced apart from each other in the second horizontal direction and a pair of second frames extending in the second horizontal direction and being spaced apart from each other in the first horizontal direction, wherein the pair of first frames and the pair of second frames are connected with each other to form a rectangular frame;
a rotary bar extending lengthwise in the first horizontal direction and passing through the pair of first frames;
a first power transfer member connected to the rotary bar and configured to rotate the rotary bar; and
a ball screw slidably attached to the rotary bar, and moves in the first horizontal direction along the pair of first frames by rotation of the rotary bar.

7. The OHT device of claim 6,
wherein the ball screw is connected to the front neck connector by some of the plurality of first connecting bolts.

8. The OHT device of claim 6,
wherein the front position movement drive unit further comprises a front/rear movement frame which includes an unevenness member attached to an inner face of the front/rear movement frame, and
wherein the front/rear movement frame moves the transport unit in a backward direction or in a forward direction along the unevenness member.

9. The OHT device of claim 1,
wherein the plurality of front bolt grooves and the plurality of rear bolt grooves comprise:
at least one first bolt opening penetrating the plate and extending lengthwise in the first horizontal direction; and a second bolt opening penetrating the plate and extending lengthwise in the second horizontal direction, wherein the second bolt opening intersects the at least one first bolt opening to form a grid-like opening.

10. An overhead hoist transport (OHT) device comprising:

a hoist unit including a plate provided with a plurality of front bolt grooves and a plurality of rear bolt grooves, wherein the plurality of front and rear bolt grooves extend from an upper surface of the plate to a lower surface of the plate; and a transport device which is placed on the plate of the hoist unit, and moves along a rail, wherein the transport device comprises:

a front body;

a front neck connector connected to a lower face of the front body;

a pair of front traveling wheels connected to opposite side faces of the front body, respectively;

a rear body;

a rear neck connector connected to a lower face of the rear body;

a pair of rear traveling wheels connected to opposite side faces of the rear body;

a front position movement drive unit placed on the lower face of the plate, and connected to the front neck connector by a plurality of first connecting bolts passing through the plurality of front bolt grooves; and a rear position movement drive unit placed on the lower face of the plate, and connected to the rear neck connector by a plurality of second connecting bolts passing through the plurality of rear bolt grooves, wherein the front position movement drive unit and the rear position movement drive unit are configured to move the front body and the rear body in response to load conditions of the pair of front traveling wheels and the pair of rear traveling wheels, wherein the pair of front traveling wheels are spaced apart from each other in a first horizontal direction, and wherein the pair of front traveling wheels are spaced apart from the pair of rear traveling wheels in a second horizontal direction perpendicular to the first horizontal direction.

11. The OHT device of claim 10, wherein when a load of the plurality of front and rear traveling wheels is measured as concentrated on a left side or a right side of the transport device, the front position movement drive unit and the rear position movement drive unit move the front neck connector and the rear neck connector in a rightward direction or in a leftward direction until the load is evenly distributed among the pair of front and rear traveling wheels, and wherein the rightward direction and the leftward direction are parallel to the first horizontal direction.

12. The OHT device of claim 10, wherein when a load of the plurality of front and rear traveling wheels is measured as concentrated on a front face or a rear face of the transport device, the front position movement drive unit and the rear position movement drive unit move the front neck connector and the rear neck connector in a backward direction or in a forward direction until the load is evenly distributed among the pair of front and rear traveling wheels, and wherein the forward direction and the backward direction are parallel to the second horizontal direction.

13. The OHT device of claim 10, wherein when a load of the plurality of front and rear traveling wheels is measured as concentrated on one of the pair of front and rear traveling wheels, the front position movement drive is configured to move the front neck connector in the first horizontal direction, and the rear position movement drive is configured to move the rear neck connector in the second horizontal direction until the load is evenly distributed among the pair of front traveling wheels and the pair of rear traveling wheels.

14. The OHT device of claim 10, wherein each of the plurality of front and rear bolt grooves extends in the first horizontal direction, and wherein the plurality of front bolt grooves are spaced apart from each other in the second horizontal direction.

15. The OHT device of claim 10, wherein the plurality of front bolt grooves include:

a plurality of first openings penetrating the plate and extending lengthwise in the first horizontal direction; and a second bolt opening penetrating the plate and extending lengthwise in the second horizontal direction, wherein the second bolt opening intersects the plurality of first bolt openings to form the plurality of first bolt grooves into a lattice shape.

16. The OHT device of claim 10, wherein the front position movement drive unit comprises:

a left/right movement frame including a pair of first frames extending in the first horizontal direction and being spaced apart from each other in the second horizontal direction and a pair of second frames extending in the second horizontal direction and being spaced apart from each other in the first horizontal direction, wherein the pair of first frames and the pair of second frames are connected with each other to form a rectangular frame;

a rotary bar extending lengthwise in the first horizontal direction and passing through the pair of first frames;

a first power transfer member connected to the rotary bar and configured to rotate the rotary bar; and a ball screw slidably attached to the rotary bar, and moves in the first horizontal direction along the pair of first frames by rotation of the rotary bar.

17. The OHT device of claim 16, wherein the ball screw is connected to the front neck connector by some of the plurality of first connecting bolts.

18. The OHT device of claim 16, wherein the front position movement drive unit further comprises a front/rear movement frame which includes an unevenness member attached to an inner face of the front/rear movement frame, and wherein the front/rear movement frame moves the transport device in a backward direction or in a forward direction along the unevenness member.

19. An overhead hoist transport (OHT) device comprising:

a hoist unit including a plate provided with a plurality of front bolt grooves and a plurality of rear bolt grooves; and a transport device which is placed on the plate of the hoist unit and moves along a rail, wherein the transport device comprises:

a body;

a front neck connector connected to a lower surface of the body;

a pair of front traveling wheels connected to opposite side faces of the body;

a rear neck connector connected to the lower face of the body;

a pair of rear traveling wheels connected to opposite side faces of the body;

a plurality of load cell sensors attached to the pair of front traveling wheels and the pair of rear traveling wheels, respectively;

a front position movement drive unit which is placed on a lower face of the plate, and connected to the front neck connector through a plurality of first connecting bolts passing through the plurality of front bolt grooves; and a rear position movement drive unit which is placed on the lower face of the plate, and connected to the rear neck connector through a plurality of second connecting bolts passing through the plurality of rear bolt grooves, wherein the plurality of load cell sensors are configured to measure a load distribution among the pair of front traveling wheels and the pair of rear traveling wheels, and wherein the front position movement drive unit and the rear position movement drive unit are configured to control a moving direction of the body so that the load distribution is evenly distributed among the pair of front traveling wheels and the pair of rear traveling wheels.

20. The OHT device of claim 19, wherein the front position movement drive unit and the rear position movement drive unit are configured to move the front neck connector and the rear neck connector along the plurality of front bolt grooves and the plurality of rear bolt grooves in a direction such that the load distribution is evenly distributed among the pair of front and rear traveling wheels.

* * * * *